United States Patent [19]

Meredith et al.

[11] Patent Number: 4,888,876
[45] Date of Patent: Dec. 26, 1989

[54] ROLLER CHAIN WEAR GAUGE

[76] Inventors: Thomas L. Meredith, Elmtree Park Apts. #993, Indianapolis, Ind. 46229; Robert C. Garrett, 1556 S. 14th St., Milwaukee, Wis. 53204

[21] Appl. No.: 272,710

[22] Filed: Nov. 17, 1988

[51] Int. Cl.⁴ ................................................ G01B 3/20
[52] U.S. Cl. .................................. 33/501.08; 33/555.1
[58] Field of Search ...................... 33/178 B, 517, 567, 33/567.1, 783, 501, 606, 600, 655, 1 BB, 501.05, 501.09, DIG. 14, 202, 700

[56] References Cited

U.S. PATENT DOCUMENTS 69,954 10/1967 Richards ............................ 33/178 B
2,684,536 7/1954 Attmer ............................... 33/178 B
2,792,634 5/1957 Howe et al. .................... 33/178 B X Primary Examiner—Harry N. Haroian
Attorney, Agent, or Firm—Foley & Lardner

[57] ABSTRACT

A roller chain wear gauge having a pair of gauge members each having two different diameter gauges, one of the gauge members being stored in the other of the gauge members and a hollow handle for storing the gauge members, the handle including a cap for closing the open end of the handle. The cap and gauge members being interconnected to form a roller chain gauge for measuring the roller spacing on four different size roller chains.

7 Claims, 1 Drawing Sheet

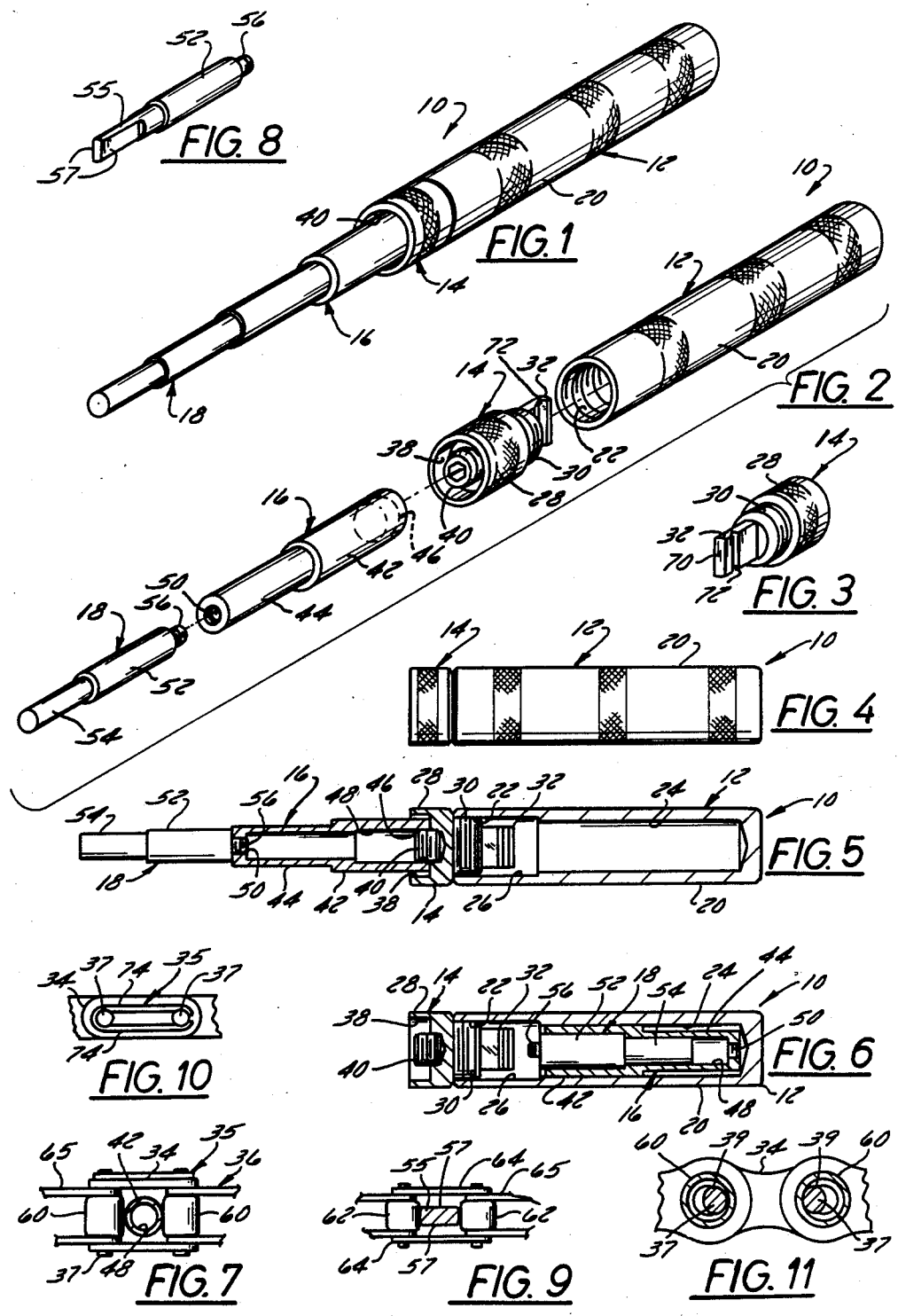

ROLLER CHAIN WEAR GAUGE

BACKGROUND OF THE INVENTION

1. Field of the Invention

This invention relates to a roller chain wear gauge and, more particularly, to a collapsible type gauge in which the gauge members are stored within the handle of the gauge.

2. Description of the Prior Art

Roller chain wear is a maintenance problem that is compounded by the nature of drive chain design, in that it is nearly impossible to determine whether a chain is excessively worn or good by appearance alone. The actual wear is incurred between the hardened pin and bushing surfaces, resulting in a "stretch" or elongation of the link spacing. When the elongation exceeds the operating tolerances of a drive chain assembly, several effects become noticeable. The first indication of wear is the resulting poor fit on the sprockets. A bad chain can quickly wear out sprocket teeth, causing a rounding or cupping of one side of the sprocket assembly. Further slack is then introduced into the power drive system, causing uneven power transfers, additional vibration, frictional heat and a general overall reduction of operating efficiency.

Roller chain wear inspection procedures typically require the user to measure the link spacing with a ruled measuring edge. This method has its shortcomings, as the inspection can only be performed to the nearest 32nd or 64th of an inch. The actual tolerance is often within thousandths of an inch, and the error introduced through the use of ruled edges can be sufficient to reach an improper conclusion concerning chain wear.

SUMMARY OF THE INVENTION

The present invention relates to a collapsible type roller chain wear gauge in which cylindrical stepped and graduated gauge members are used to form the gauge. The gauge members are stored within the handle of the gauge with a cap provided to secure the gauge member in the handle. When the gauge is required to inspect a chain, the cap is removed, the gauge members are taken out of the handle and the cap replaced on the handle. The gauge members are simply and easily coaxially arranged and assembled on the cap. The gauge members, which are progressively smaller in diameter, are merely inserted into the space between the rollers on the chain. If the corresponding gauge members cannot pass between the rollers, the chain is acceptable.

A principal feature of the invention is the provision of an effective, simple to use method for determining chain wear which is accurate.

A further feature of the invention is the potential for improved machine and equipment life with a correspondingly lower maintenance cost through the use of the gauge.

Other principal features and advantages of the invention will become apparent to those skilled in the art upon review of the following detailed description, claims and drawings.

BRIEF DESCRIPTION OF THE DRAWINGS

FIG. 1 is a perspective view of the roller chain gauge according to the present invention.

FIG. 2 is a exploded perspective view of the roller chain gauge.

FIG. 3 is a perspective view of the cap.

FIG. 4 is a side view of the handle with the gauge member stored within the handle.

FIG. 5 is a side sectional view with the gauge member assembled on the end of the handle.

FIG. 6 is a side sectional view showing the roller gauge member stored within the handle.

FIG. 7 is a view of a section of a roller chain showing one of the cylindrical gauges positioned between the rollers.

FIG. 8 is a view of an alternate form of roller chain wear gauge.

FIG. 9 is a view of a section of roller chain showing the gauge of FIG. 8 positioned between the rollers.

FIG. 10 is a side view of the pin link showing the retainer.

FIG. 11 is a side view in section of a worn pin link.

Before explaining at least one embodiment of the invention in detail, it is to be understood that the invention is not limited in its application to the details of construction and the arrangement of the components set forth in the following description or illustrated in the drawings. The invention is capable of other embodiments and of being practiced or carried out in various ways. Also, it is to be understood, that the phraseology and terminology employed herein is for purposes of description and should not be regarded as limiting.

DETAILED DESCRIPTION OF A PREFERRED EXEMPLARY EMBODIMENT

The roller chain gauge 10, according to the invention, includes a handle 12, a cap 14, a first gauge member 16, and a second gauge member 18. As seen in FIG. 1, the gauge members 16 and 18 are mounted on the cap 14 which is, in turn, mounted on the end of the handle 12. The gauge members 16 and 18 are detachable from each other and from the cap so they can be telescoped into the handle 12 and secured therein by the cap 14 as shown in FIG. 6.

The handle 12 is formed of a generally cylindrical hollow tube 20 having a bore 24 and a counter-bore 26. The counter-bore 26 is provided with a threaded section 22 at the open end.

The handle is closed by means of the cap 14 which includes a cylindrical boss 28 on one side having threaded section 30 which matingly engages the threaded section 22 in the counter-bore 26 of the handle 12. Means 32 is provided at the end of the boss 30 for opening the master link retainer 35 on the pin link 34 of roller chain 36 as described hereinafter. The cap 14 has a recess 38 in the other side which is provided with a threaded stud 40.

The gauge member 16 includes two graduated diameters forming a first cylindrical gauge 42 and a second cylindrical gauge 44 which corresponds to the allowable and excessive tolerance for a given chain size. The gauge 42 is in the form of a cylindrical tube having a bore 48. A threaded section 46 is provided at the end of the bore 48. A threaded opening 50 is also provided in the end of the gauge 44.

The gauge member 18 includes two graduated diameters forming a first cylindrical gauge 52 and a second cylindrical gauge 54 which correspond to the allowable and excessive tolerances for two smaller chain sizes than the gauge member 16. The gauge 52 having a diameter less the diameter of gauge 44 and greater than the diameter of gauge 54. A threaded stud 56 is provided on the end of the gauge 52 for mating engagement with the threaded opening 50 at the end of gauge 44.

The roller chain wear gauge is normally collapsed by inserting the gauge member 18 into the bore 48 of the gauge member 16. Gauge member 16 is then inserted into the bore 24 of the handle 12. The handle is closed by screwing the threaded section 30 of the cap 14 into the threaded opening 22 at the end of the handle 12. The gauge is assembled by removing the cap 14 from the handle 12 and dropping the gauge members 16 and 18 out of the handle. The cap is then mounted on the end of the handle by screwing the threaded section 30 into the threaded opening 22. The gauge member 18 is removed from the gauge member 16 and the gauge member 16 is mounted on the threaded stud 40 by screwing the threaded section 46 onto the threaded stud 40. The threaded end 66 of the gauge member 18 is then threaded into the threaded opening 50 at the end of the gauge member 16.

The "allowable" or "excessive" tolerances for a given chain size are determined by inserting the gauge 42, 44, 52 or 54 into the space in the pin link 34 between rollers 60. It should be noted that wear in a roller chain occurs between the pins 37 and the bushings 39. As wear occurs, the distance between the rollers 60 in the pin links 34, as seen in FIG. 11, will increase. The distance between the rollers 60 in the bushing links 41 will not change. The gauges 42, 44, 52 and 54 have diameters slightly larger than the allowance tolerance between the rollers, generally about three percent. If the gauge for the corresponding chain does not fit between the rollers, then the tolerance is "allowable". If the corresponding gauge passes through the roller on the pin link 34, then the tolerance is "excessive" and the chain replaced.

In the embodiment of the invention shown in FIG. 8, the gauge 18 is provided with a gauge member 55 which has flat surfaces 57 on each side. This type of gauge is used for a light weight chain which has rollers 62 which have a smaller width than the diameter of the gauge 55. The gauge is, therefore, cut down on the sides in order to clear the links 64 which are provided on each side of the roller chain.

As seen in FIG. 10, the opening means 32 on the cap 14 is used to release the master link retainer 35 from the pin link 34. The retainer 35 is in the form of an elongate "U" which snaps onto the ends of pins 37. The opening means 32 includes a flat rectangular member 70 having a tapered groove 72. The member 70 fits between the legs 74 of the "U" shaped retainer 35. On rotation of the rectangular section, the legs 74 will separate at the open end from the pin 37. At the same time, one of the legs 74 will be cammed into the tapered groove 72 to release the retainer from the pins 37.

Thus, it is apparent, there has been provided, in accordance with the invention, a collapsible roller chain wear gauge that fully satisfies the aims and advantages set forth above. While the invention has been described in conjunction with specific embodiments thereof, it is evident that many alternatives, modifications, and variations will be apparent to those skilled in the art. Accordingly, it is intended to embrace all such alternatives, modifications, and variations as fall within the spirit and broad scope of the appended claims.

The embodiments of the invention in which an exclusive property or privilege is claimed, are defined as follows:

1. A collapsible roller chain wear gauge comprising:
   a hollow cylindrical handle having an axial bore closed at one end and an internal threaded at the other end;
   a cap having a threaded section on one end for matingly engaging the threaded opening in said handle;
   a first hollow cylindrical gauge member having an outer diameter smaller than the diameter of said handle;
   means for connecting said first gauge member to said cap;
   a second cylindrical gauge member having a diameter smaller than the diameter of the bore in said first gauge member; and
   means for connecting said second gauge member to said first gauge member whereby said second gauge member can be stored in said first gauge member and said first gauge member can be stored in said handle.

2. The gauge according to claim 1 wherein said cap includes a threaded stud on the other end, and said first gauge member connecting means comprises an internal threaded section at one end for engaging said threaded stud on said cap.

3. The gauge according to claim 1 wherein said first gauge member includes a threaded bore at the other end and said second gauge member connecting means comprises a threaded stud for engaging said threaded bore in said first gauge member.

4. The gauge according to claim 1 wherein said first gauge member includes a first section and a second section of different diameters and said second gauge member has a third section and a fourth section of different diameters whereby said gauge, when assembled, can be used to measure four different size roller chains.

5. The gauge according to claim 1, 2, 3 or 4 wherein said cap includes means for releasing a master link retainer from the roller chain pin link.

6. The gauge according to claim 2 wherein said first gauge member includes a threaded bore at the other end and said second gauge member connecting means comprises a threaded stud for engaging said threaded bore in said first gauge member.

7. The gauge according to claim 2 or 6 wherein said first gauge member includes a first section and a second section of different diameters and said second gauge member has a third section and a fourth section of different diameters whereby said gauge when assembled can be used to measure four different size roller chains.

* * * * *